(12) United States Patent
Mishina et al.

(10) Patent No.: US 7,183,561 B2
(45) Date of Patent: Feb. 27, 2007

(54) RADIATION IMAGE CONVERSION PANEL AND MANUFACTURING METHOD THEREOF

(75) Inventors: Noriyuki Mishina, Ome (JP); Takafumi Yanagita, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/181,291

(22) Filed: Jul. 14, 2005

(65) Prior Publication Data

US 2006/0017007 A1    Jan. 26, 2006

(30) Foreign Application Priority Data

Jul. 22, 2004   (JP)   ............... 2004-214263

(51) Int. Cl.
  *G03B 42/08*    (2006.01)
(52) U.S. Cl. ................................. 250/484.4
(58) Field of Classification Search .......... 250/484.4
  See application file for complete search history.

(56) References Cited

U.S. PATENT DOCUMENTS

| | | | |
|---|---|---|---|
| 3,859,527 A | | 1/1975 | Luckey |
| 4,505,989 A | * | 3/1985 | Umemoto et al. ........... 428/691 |
| 4,906,893 A | * | 3/1990 | Homma et al. ............. 313/525 |
| 4,963,751 A | * | 10/1990 | Kano et al. ............... 250/484.4 |
| 5,098,813 A | * | 3/1992 | Nakano et al. ............. 430/139 |
| 2002/0139937 A1 | * | 10/2002 | Hosoi ....................... 250/484.4 |
| 2003/0102797 A1 | * | 6/2003 | Kajiwara .................... 313/486 |
| 2003/0209675 A1 | * | 11/2003 | Maezawa et al. ........ 250/484.4 |

FOREIGN PATENT DOCUMENTS

| | | |
|---|---|---|
| JP | 59-22046 A | 2/1984 |
| JP | 59-75200 A | 4/1984 |
| JP | 61-072087 A | 4/1986 |
| JP | 61-073786 A | 4/1986 |
| JP | 61-073787 A | 4/1986 |
| JP | 61-142497 A | 6/1986 |
| JP | 61-142500 A | 6/1986 |
| JP | 62-039737 A | 2/1987 |
| JP | 62-110200 A | 5/1987 |
| JP | 02-058000 A | 2/1990 |

\* cited by examiner

*Primary Examiner*—David Porta
*Assistant Examiner*—Mark R. Gaworecki
(74) *Attorney, Agent, or Firm*—Frishauf, Holtz, Goodman & Chick, P.C.

(57) ABSTRACT

It is an object to provide a radiation image conversion panel exhibiting excellent X-ray irradiation resistance property and a manufacturing method thereof. Disclosed is a radiation image conversion panel having a stimulable phosphor layer containing a stimulable phosphor provided on a support, wherein the stimulable phosphor is expressed by the following general formula (1), and the stimulable phosphor layer contains NaX''' of 5–25 PPM (X''' is at least one halogen atom selected from the group including F, Cl, Br, and I). General Formula (1); $M^1X \cdot aM^2X' \cdot bM^3X''_3 : eA$, provided that X is not X''' when $M^1$ or $M^2$ is Na.

6 Claims, 2 Drawing Sheets

RADIATION IMAGE CONVERSION PANEL AND MANUFACTURING METHOD THEREOF

This application claims priority from Japanese Patent Application No. Jp2004-214263 filed on Jul. 22, 2004, which is incorporated hereinto by reference.

TECHNICAL FIELD

The present invention relates to a radiation image conversion panel employing a stimulable phosphor and a manufacturing method thereof, and to the radiation image conversion panel exhibiting excellent X-ray irradiation resistance property and a manufacturing method of the same.

BACKGROUND

Although so-called radiography employing silver halide photography is conventionally used to obtain radiographic images, there also has been developed a radiographic imaging method not using silver halide photographic material. Thus, an imaging method is disclosed, in which radiation that has been transmitted through an object is absorbed by phosphor, followed by exciting the phosphor with an energy to cause a radiation energy accumulated in the phosphor to radiate in the form of fluorescence, and imaging is achieved by detecting the fluorescence.

Specifically, U.S. Pat. No. 3,859,527 discloses a radiation image conversion method, in which a panel comprising on a support a photostimulable phosphor layer is employed using either or both visible light and infrared rays as the stimulating energy.

There have been developed radiation image conversion methods using a photostimulable phosphor (hereinafter, also denoted simply as a stimulable phosphor) exhibiting enhanced luminance and high sensitivity, including, for example, a radiation image conversion method employing $BaFX:Eu^{2+}$ type phosphor (X: Cl, Br, I), as described in Japanese Patent Publication Open to Public Inspection No. 59-75200 (hereinafter, referred to as Japanese Patent O.P.I. Publication); a radiation image conversion method employing an alkali halide phosphor, as described in Japanese Patent O.P.I. Publication No. 61-72087; a radiation image conversion method employing an alkali halide phosphor containing, as coactivators, $Tl^+$ and metals such as $Ce^{3+}$, $Sm^{3+}$, $Eu^{3+}$, $Y^{3+}$, $Ag^+$, $Mg^{2+}$, $Pb^{2+}$ or $In^{3+}$, as described in Japanese Patent O.P.I. Publication Nos. 61-73786 and 61-73787.

Recently, a radiation image conversion panel exhibiting further enhanced sharpness has been desired in the field of diagnostic image analysis. Of these, an attempt in controlling the form of stimulable phosphor grains to enhance sensitivity and sharpness was made as a means for improving sharpness of radiographic images.

For example, Japanese Patent O.P.I. Publication No. 61-142497 discloses a method of using a stimulable phosphor layer comprising a fine pseudo-columnar block which has been formed by accumulating a stimulable phosphor on a support having fine protruded patterns.

Further, proposed methods include a method to use a radiation image conversion panel having a stimulable phosphor layer, in which, as described in Japanese Patent O.P.I. Publication No. 61-142500, cracks between columnar blocks, which are prepared by accumulating a stimulable phosphor on a support having a fine pattern, are subjected to a shock treatment so that the aforesaid cracks are allowed to grow. Further, Japanese Patent O.P.I. Publication 62-39737 discloses a method of using a radiation image conversion panel having a stimulable phosphor layer with a pseudo-columnar form which has been formed by producing cracks on the layer surface side. Japanese Patent O.P.I. Publication 62-110200 proposes a method in which a stimulable phosphor layer having voids is formed by vapor deposition onto the upper surface of a support, followed by growing voids by subjecting a heating treatment to produce cracks.

Japanese Patent O.P.I. Publication No. 2-58000 proposed a radiation image conversion panel having a stimulable phosphor layer, in which long and thin columnar crystals were formed with an incline at a given angle toward the direction normal to the support.

Recently, a radiation image conversion panel using a stimulable phosphor containing an alkali halide such as CsBr as a basic substance and Eu as an activator, and the use of activator Eu leading to enhanced X-ray conversion efficiency, which has formerly not been achieved.

While the image quality is further improved in such a way, and the radiation image conversion panel is increasingly used for photography, a radiation image conversion panel exhibiting higher X-ray irradiation resistance property is preferred since it is well known that luminance of the radiation image conversion panel via X-ray irradiation is degraded.

SUMMARY

It is an object of the present invention to provide a radiation image conversion panel exhibiting excellent X-ray irradiation resistance property, and a manufacturing method thereof.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

BRIEF DESCRIPTION OF THE PREFERRED EMBODIMENTS

Figure 1:
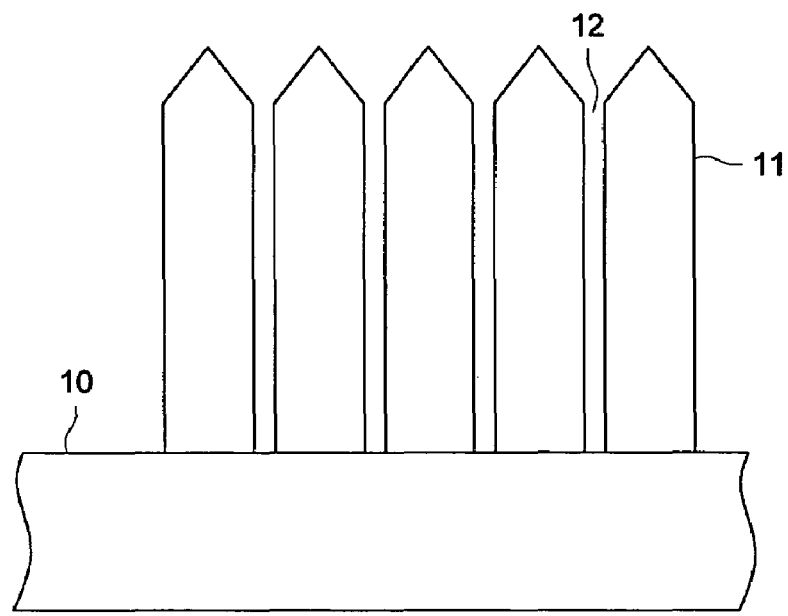
FIG. 1 is a schematic cross-sectional view of the stimulable phosphor surface.

The aforesaid object can be accomplished via the following structures.

(Structure 1) A radiation image conversion panel having a stimulable phosphor layer containing a stimulable phosphor provided on a support, wherein the stimulable phosphor is expressed by following general formula (1), and the stimulable phosphor layer contains $NaX'''$ of 5–25 PPM where $X'''$ is at least one halogen atom selected from the group including F, Cl, Br, and I.

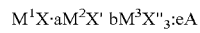
General Formula (1);

where $M^1$ is at least one alkaline metal atom selected from the group including Li, Na, K, Rb, and Cs; $M^2$ is at least one alkaline metal atom selected from the group including Li, Na, K, Rb, and Cs except for $M^1$; $M^3$ is at least one trivalent metal atom selected from the group including Y, La, Ce, Pr, Nd, Pm, Sm, Eu, Gd, Tb, Dy, Ho, Er, Tm, Yb, and Lu; X, X', and X" each represents at least one halogen atom selected from the group including F, Cl, Br, and I; A represents at least one metal atom selected from the group including Eu, Tb, In, Ce, Tm, Dy, Pr, Ho, Nd, Yb, Er, Gd, Lu, Sm, and Y; and "a", "b", and "e" are numbers satisfying the conditions of $0 \leq a < 0.5$, $0 \leq b < 0.5$, and $0 < e \leq 0.2$, respectively, provided that X is not X''' when $M^1$ or $M^2$ is Na.

(Structure 2) The radiation image conversion panel of Structure 1, wherein the stimulable phosphor expressed by aforesaid general formula (1) is a stimulable phosphor expressed by the following general formula;

CsBr:yEu                                             General Formula (2)

where y is the numerical value in the range of $0 < y \leq 0.2$.

(Structure 3) A method for manufacturing the radiation image conversion panel of Structure 1 or 2, wherein the stimulable phosphor layer having columnar crystals provided on a support is formed via vapor deposition by heating the raw stimulable phosphor material charged into a crucible to 600–800° C. by a resistance heating method.

(Structure 4) The radiation image conversion panel of Structure 1, wherein the stimulable phosphor is a compound expressed by aforesaid general formula (1), and comprises NaX''' of 5–25 PPM where X''' is at least one halogen atom selected from the group including F, Cl, Br, and I.

(Structure 5) The radiation image conversion panel of Structure 1, wherein the stimulable phosphor layer having columnar crystals provided on a support is formed via vapor deposition by heating the raw stimulable phosphor material charged into a crucible to 600–800° C. by a resistance heating method.

(Structure 6) The radiation image conversion panel of Structure 1, wherein the stimulable phosphor consists of a compound expressed by aforesaid general formula (1), and contains NaX''' of 5–25 PPM where X''' is at least one halogen atom selected from the group including F, Cl, Br, and I.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

It is found by the inventors that a radiation image conversion panel exhibiting excellent X-ray irradiation resistance property can be obtained when the radiation image conversion panel has a stimulable phosphor layer provided on a support in which a stimulable phosphor contains an alkali halide as a basic substance, and the stimulable phosphor layer contains NaX''' of 5–25 PPM where X''' is at least one halogen atom selected from the group including F, Cl, Br, and I. The reason to determine a specified range of Na content as described above, is that a CsBr crystal of a cesium chloride type crystal structure results in an unstable crystal structure caused by small atoms being easily penetrated into interatomic spacing. It is also found by the inventors that the crystal structure can be stabilized by containing NaX''' of 5–25 ppm in CsBr crystals, and higher crystallographic stability to counter X-ray irradiation can also be obtained.

Incidentally, in the case of being less than 5 ppm, X-ray resistance property is insufficient in view of feasibility to stabilize the crystal structure, and in the case of being not less than 25 ppm, the order of the CsBr crystal structure is disrupted because of introducing an excessive amount of the elements into CsBr crystals.

The present invention will be explained in detail as described below.

[Support]

Various kinds of glass, polymers and metals are employed as the support of the radiation image conversion panel of the present invention. Disclosed examples of the support are a palate of glass such as that of quartz, borosilicate glass, and chemically strengthen glass, a film of plastic such as that of cellulose acetate, polyester, poly(ethylene terephthalate), polyamide, polyimide, triacetate and polycarbonate, and a sheet of metal such as that of aluminum, iron and copper. Of these, the preferable example of the support is a metal substrate containing aluminum as a major component or glass. The surface of these supports may be smooth or matted for raising the adhesive property with the stimulable phosphor.

In the present invention, an adhesive layer may be previously provided, if desired, for improving the adhesiveness between the support and the stimulable phosphor layer. The thickness of the support is usually from 80 to 2,000 μm and further preferably from 80 to 1,000 μm from the viewpoint of easiness of handling even though the thickness may be varied depending on the material of the support.

[Stimulable Phosphor]

A stimulable phosphor used in the present invention is expressed by the following general formula (1)

$M^1X \cdot aM^2X' \cdot bM^3X''_3:eA$                         General Formula (1)

Wherein $M^1$ is at least one alkaline metal atom selected from the group including Li, Na, K, Rb, and Cs; $M^2$ is at least one alkaline metal atom selected from the group including Li, Na, K, Rb, and Cs except for $M^1$; $M^3$ is at least one trivalent metal atom selected from the group including Y, La, Ce, Pr, Nd, Pm, Sm, Eu, Gd, Tb, Dy, Ho, Er, Tm, Yb, and Lu; X, X', and X" each represents at least one halogen atom selected from the group including F, Cl, Br, and I; A represents at least one metal atom selected from the group including Eu, Tb, In, Ce, Tm, Dy, Pr, Ho, Nd, Yb, Er, Gd, Lu, Sm, and Y; and "a", "b", and "e" are numbers satisfying the conditions of $0 \leq a < 0.5$, $0 \leq b < 0.5$, and $0 < e \leq 0.2$ respectively.

It is preferred in the aforesaid General Formula (1) that $M^1$ is at least one alkaline metal atom selected from the group including K, Rb, and Cs; X is at least one halogen atom selected from the group including Br and I; $M^3$ is at least one trivalent metal atom selected from the group including Y, Ce, Sm, Eu, Al, La, Gd, Lu, Ga, and In; A represents at least one metal atom selected from the group including Eu, Cs, Sm, Tl, and Na; and "b" is a number satisfying the condition of $0 \leq b \leq 10^{-2}$.

It is preferable that a stimulable phosphor, expressed by the following General Formula (2), is used.

CsBr:yEu                                             General Formula (2)

where y shows a numerical value in the range of $0 < y \leq 0.2$, or preferably in the range of $1 \times 10^{-7} \leq y \leq 1 \times 10^{-2}$.

[FORMATION OF STIMULABLE PHOSPHOR]

First, a stimulable phosphor formed via vapor deposition will be described.

Employed as vapor deposition methods of the stimulable phosphor may be a vacuum evaporation method, a sputtering method, and a CVD method.

A vacuum evaporation method is conducted in such a manner that after placing a support in an evaporation apparatus, the inside of the apparatus is initially evacuated to a vacuum degree of $1.33\times10^{-4}$ Pa and subsequently, the vacuum degree is adjusted to be in the range of $1.33\times10^{-2}$–$1.33$ Pa by introducing a gas into the vacuum chamber. After this, at least a stimulable phosphor is evaporated with heating by a resistance heating method or an electron-beam method to cause the phosphor to deposit on the surface of the support to a desired thickness. As a result, a stimulable phosphor layer containing no binder is formed.

A sputter deposition method is conducted in such a manner that after setting a support in a sputtering apparatus, the inside of the apparatus is evacuated to a vacuum degree of $1.33\times10^{-4}$ Pa and then inert gas used for sputtering such as Ar and Ne is introduced thereto at a gas pressure of $1.33\times10^{-1}$ Pa. Subsequently, sputtering is carried out with targeting the stimulable phosphor to cause the phosphor to deposit on the surface of the support so as to have a desired thickness.

Using plural raw materials of a stimulable phosphor as a target, sputtering is simultaneously or successively carried out to form an intended stimulable phosphor layer on the support. Gas such as $O_2$ and $H_2$ may optionally be introduced to perform reactive sputtering. Sputtering may be carried out while heating or cooling substrate to be deposited thereon. After completion of sputtering, the stimulable phosphor layer may be subjected to a heating treatment.

A CVD method is a method in which an intended stimulable phosphor or an organic metal compound containing a raw material of the stimulable phosphor is degraded using energy such as heat or high-frequency electric power to form a stimulable phosphor layer containing no binder on the support, which enables growing respectively long thin columnar crystals in the inclined direction to the line normal to the surface of the support.

In the present invention, a stimulable phosphor layer can be formed via vapor deposition, and the sputtering stage may be divided to plural steps to form a stimulable phosphor layer.

It is a feature in the present invention that the stimulable phosphor layer contains Na X''' of 5–25 ppm, where X''' is at least one halogen atom selected from the group including F, Cl, Br and I. A significant level of X-ray irradiation resistance property can not be practically achieved in the case of Na X''' of less than 5 ppm, and image quality also drops because of deterioration of the persistence characteristics of a phosphor in the case of Na X''' of more than 25 ppm. In order to contain Na X''' of 5–25 ppm in the stimulable phosphor layer, where X''' is at least one halogen atom selected from the group including F, Cl, Br and I, the amount of Na X''' is adjusted to be added into raw materials of the above stimulable phosphor, and the stimulable phosphor layer containing NaX''' is deposited on the surface of the support to a desired thickness via a vacuum evaporation method, a sputtering method, or a CVD method. An inductively coupled plasma optical emission spectroscopy (hereinafter, referred to as ICP-AES) can be used for measurement of NaX''' concentration.

A vacuum evaporation technique is preferably applicable as a vapor deposition method in the present invention. Formation of the stimulable phosphor layer via vacuum evaporation will hereinafter be described in detail. Incidentally, the case for growing the columnar crystals via vapor deposition will hereinafter be explained.

While introducing a gas into a vacuum chamber so as to adjust a vacuum degree inside the evaporation apparatus to be $1.33\times10^{-2}$–$1.33$ Pa, the stimulable phosphor layer having an independent long columnar crystal structure can be obtained by a method in which the vapor of the stimulable phosphor or a raw material thereof is supplied onto a substrate at a specified incident angle to grow the crystallite as a method for forming the stimulable phosphor layer via vacuum evaporation; such the method is referred to as a vapor deposition method.

It is preferable that a gas flow rate is 0.001–1,000 sccm (sccm: standard ml/min or $1\times10^{-6}$ m$^3$/min) to maintain the vacuum degree in the apparatus at $1.33\times10^{-2-1.33}$ Pa. In the case of the gas flow rate exceeding 1,000 sccm, disturbance in the vapor stream depending on the gas flow deteriorates growth of the phosphor. In the case of the gas flow rate less than 0.001 sccm, adhesion to the substrate also drops.

It is preferred that the gas to adjust a vacuum degree is nitrogen or argon.

There is a method of placing a support tilted to the crucible in which an evaporation source is charged, in order to supply vapor streams of the stimulable phosphor or the raw phosphor material in the direction of a specified incident angle to the support surface. There is also another, possible method of placing the support and the crucible to be in parallel with each other and controlling vapor streams in such a way that only an oblique component from the evaporation plane of the crucible in which the evaporation source is charged, is evaporated onto the support through a slit. In these cases, a minimal distance between the support and the crucible, so as to fit the average flight of the stimulable phosphor, is preferably designed to be approximately 10 to 60 cm.

In order to improve a modulation transfer function (MTF) associated with the stimulable phosphor layer having columnar crystals, size of a columnar crystal is preferably 1 to 50 μm and is more preferably 1 to 30 μm, where the size of a columnar crystal is a mean value of diameters obtained by converting cross-sectional areas of each columnar crystal into circles through an observation of the surface of the columnar crystal parallel to the plane of a support, and it is calculated using a micrograph including at least 100 columnar crystals or more in the field of vision. When the columnar crystal is thinner than 1 μm in size, MTF drops because of stimulated emission light scattered by the columnar crystal and also when the columnar crystal is 50 μm or thicker in size, MTF also drops because of decline in the directivity of stimulated emission light.

Spacing in length between columnar crystals is preferably not more than 30 μm and is still more preferably not more than 5 μm. When spacing in length exceeds 30 pim, sensitivity drops since a filling factor of phosphor in the stimulable phosphor layer declines.

Thickness of the stimulable phosphor layer formed by the above method varies, depending on sensitivity of an intended radiation image conversion panel, the type of stimulable phosphors, and others, but it is preferably selected in the range between 10 and 1000 μm, or more preferably in the range between 20 and 800 μm.

When a stimulable phosphor layer is prepared via the above vapor deposition, the stimulable phosphor as an evaporation source may be melted homogeneously or molded by a press or a hot press, followed by being charged into a crucible. Further, it is preferred to conduct a degassing treatment. Evaporation of a stimulable phosphor from the evaporation source can be conducted by scanning with an electron beam ejected by an electron gun but other methods may be applied to perform the evaporation.

The evaporation source is not necessarily a stimulable phosphor, and raw material of a stimulable phosphor may be mixed thereto.

With respect to activators, a mixture of an activator with a basic substance may be evaporated. Alternatively, the basic substance is evaporated, followed by doping the activator. For example, RbBr, as basic substance is evaporated alone, followed by doping Tl as an activator. In this case, since respective crystals exist isolated with each other, doping becomes feasible even in the case of a thick phosphor layer, and difficulty of proceeding crystal growth results in no reduced MTF. Doping is performed by allowing a doping agent (dopant) to be introduced into the basic substance layer of a phosphor by means of thermal diffusion or iron injection.

Further, spacing between columnar crystals may be filled with a filler such as a binding agent to strengthen the phosphor layer. Furthermore, material exhibiting relatively high light absorbance or reflectance may be used as filler. The use thereof prevents lateral diffusion of stimulated emission light entering into the phosphor layer, in addition to the aforesaid strengthening effect.

The material exhibiting high reflectance refers to one exhibiting a high reflectance with respect to stimulated emission light (500 to 900 nm, specifically 600 to 800 nm), including metals such as aluminum, magnesium, silver, indium, and white pigments and color materials ranging green to red.

White pigments can also reflect stimulating light. Examples thereof include $TiO_2$ (anatase type, rutile type), MgO, $PbCO3 \cdot Pb(OH)_2$, $BaSO_4$, $Al_2O_3$, M(II)FX [in which M(II) is at least one of Ba, Sr or Ca, X is at least one of Cl or Br], $CaCO_3$, ZnO, $Sb_2O_3$, $SiO_2$, $ZrO_2$, lithopone ($BaSO_4 \cdot ZnS$), magnesium silicate, basic lead silicosulfate, basic lead phosphate, and aluminum silicate. These pigments exhibit high covering power and have a refractive index high, whereby stimulated luminescence is easily scattered through reflection or refraction, leading to enhanced sensitivity of the radiation image conversion panel.

Examples of material exhibiting high light absorbance include carbon, chromium oxide, nickel oxide, iron oxide, and color materials of blue. Of these, carbon absorbs stimulated luminescence.

Color materials may be any organic or inorganic color materials. Examples of organic color materials include Zapon fastblue 3G (product of Hoechst Marion Roussel, Ltd.), Estrol Brillblue N-3RL (product of Sumitomo Chemical Co., Ltd.), D&C Blue No. 1 (producy of National Aniline Co.), Spirit Blue (Hodogaya Chemical Co., Ltd.), Oilblue No. 603 (product of Orient Co.), Kiton Blue A (product of Ciba-Geigy AG. GmbH.), Aisen Cationblue GLH (Hodogaya Chemical Co., Ltd.), Lakeblue AFH (product of Kyowa Industry Co., Ltd.), Primocyanine 6GX (Inabata & Co., Ltd.), Brillacid Green 6BH (product of Hodogaya Chemical Co., Ltd.), Cyanblue BNRCS (product of TOYO INK MFG. CO., LTD.), and Lyonol Blue SL (product of TOYO INK MFG. CO., LTD.). There are also cited organic complex colorants such as Color Index Nos. 24411, 23160, 74180, 74200, 22800, 23154, 23155, 24401, 14830, 15050, 15760, 15707, 17941, 74220, 13425, 13361, 13420, 11836, 74140, 74380, 74350, and 74460. Examples of inorganic colorants include ultramarine, cobalt blue, cerulean blue, chromium oxide, and $TiO_2$-ZnO-Co-NiO type pigments.

[PROTECTIVE LAYER]

The radiation image conversion panel according to the present invention may have a protective layer on a stimulable phosphor layer.

The protective layer either may be formed by directly coating a protective layer coating liquid on the stimulable phosphor or by adhering of a separately formed protective layer onto the stimulable phosphor layer. As the material of the protective layer, usual materials for protective layer are employable such as cellulose acetate, nitrocellulose, poly (methyl methacrylate), poly(vinyl butyral), poly(vinyl formal), polycarbonate, polyester, poly(ethylene phthalate), polyethylene, poly(vinylidene chloride), Nylon, poly(ethylene fluoride), poly(trifluoroethylen chloride), tetrafluoroethylene-hexafluoropropylene copolymer, vinylidene chloride-vinyl chloride copolymer and vinylidene chloride-acrylonitrile copolymer. A transparent glass plate can also be employed as the protective layer. The protective layer may be formed by accumulation of an inorganic material such as SiC, $SiO_2$, SiN and $Al_2\theta_3$ by the vapor deposition method or the spattering method. The thickness of the protective layer is usually from 0.1 to 2,000 μm.

Embodiments of the present invention will be described, referring to figures.

FIG. 1 is a schematic cross-sectional view of the stimulable phosphor surface. Numeral 10 is a support, 11 is a stimulable phosphor layer, showing a columnar crystal which constitutes the aforesaid stimulable phosphor layer. Incidentally, 12 is spacing formed between columnar crystals.

Figure 2:
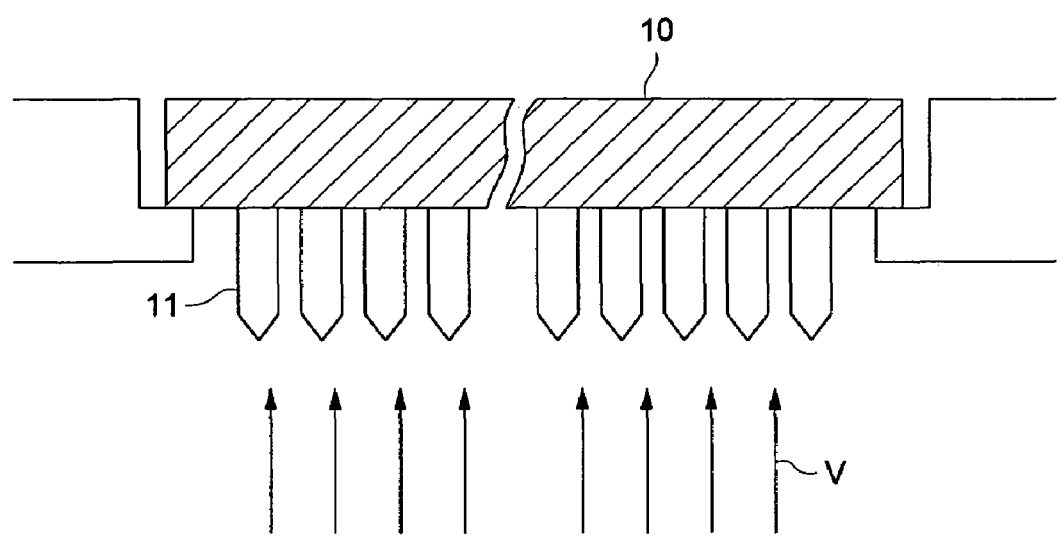
FIG. 2 shows formation of a stimulable phosphor layer on a support via vacuum evaporation.

FIG. 2 shows formation of the stimulable phosphor layer on a support via vacuum evaporation. When vapor stream V of the stimulable phosphor is injected in the direction of the normal line of the support surface, columnar crystals can be grown in the direction of the normal line of the support surface. When the incident angle of vapor stream V of the stimulable phosphor to the direction of the normal line of the support surface is represented by $\theta_2$, and the angle of the formed columnar crystal to the direction of the normal line of the support surface is represented by $\theta_1$, the columnar crystals are formed in the direction of angle $\theta_1$. $0° \leq \theta_1$ and $\theta_2 \leq 20°$ are desired in the present invention, and it is preferable that columnar crystals vertically grown from the support surface can be obtained.

Figure 3:
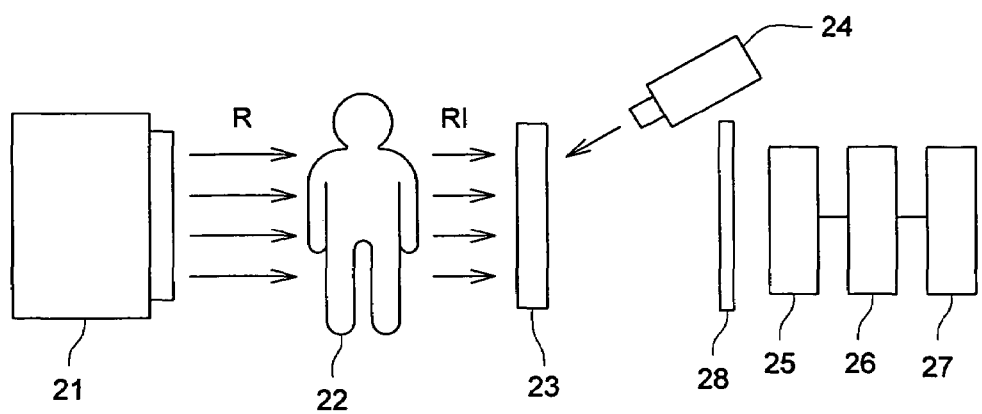
FIG. 3 is a schematic illustration showing an example of use of the radiation image conversion panel according to the present invention.
Figure 4:
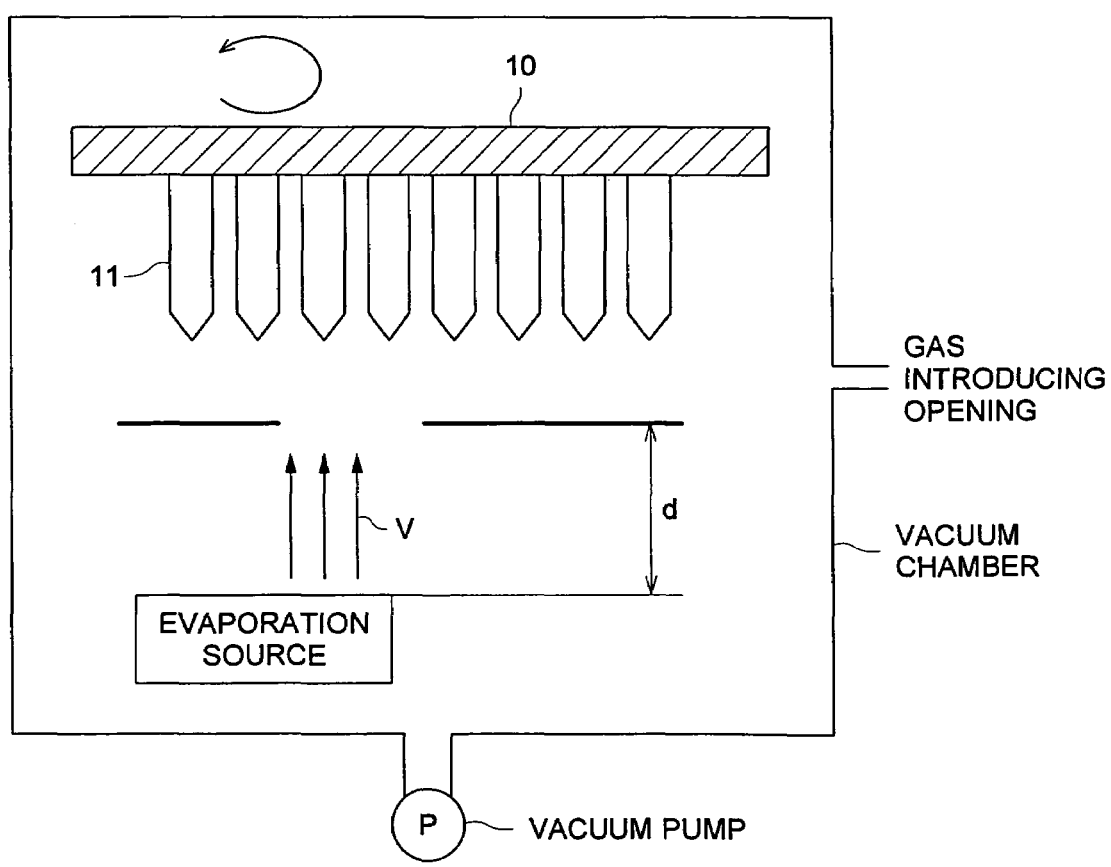
FIG. 4 is a schematic illustration showing a vacuum evaporation type vapor deposition apparatus.

FIG. 3 is a schematic illustration showing an example of use of the radiation image conversion panel according to the present invention.

In FIG. 3, numeral 21 is a radiation generating apparatus, 22 is an object, 23 is a radiation image conversion panel provided with a visible light and infrared radiation stimulable phosphor layer comprising stimulable phosphors, 24 is a stimulated emission light source which allows a radiation latent image of radiation image conversion panel 23 to emit as stimulated luminescence, 25 is a photoelectric conversion apparatus which detects the stimulated luminescence emitted from radiation image conversion panel 23, 26 is an apparatus which reproduces photoelectric conversion signals detected by photoelectric conversion apparatus 25 as an image, 27 is an apparatus which displays the reproduced images, and 28 is a filter which eliminates reflection light from light source 24 and transmits only light emitted from radiation image conversion panel 23. Incidentally, FIG. 3 shows an example to obtain a radiation transmitted image of an object. However, when object 22 itself emits radiation, aforesaid radiation generating apparatus 21 is not particularly necessary. Further, apparatuses following photoelectric conversion apparatus 25 may be any apparatuses as long as it is possible to reproduce light information from radiation image conversion panel 23 to an image in any form, and are not limited to the foregoing.

Employed as stimulated emission light source 24 is a light source including the stimulated emission light wavelength of the stimulable phosphor used in radiation image conversion panel 23. Specifically, the use of laser beams simplifies the optical system and increases the intensity of the stimulated emission light, whereby it is possible to enhance the efficiency of stimulated luminescence, while achieving more preferred results.

Examples of lasers include He-Ne lasers, He-Cd lasers, Ar ion lasers, Kr ion lasers, $N_2$ lasers, YAG lasers and second higher harmonics thereof, ruby lasers, semiconductor lasers, various dye lasers, and metal vapor lasers such as a copper vapor laser. Commonly, preferred are continuously oscillating lasers such as He-Ne lasers and Ar lasers. In addition, when a single pixel scanning time and a pulse are synchronized, it is possible to use pulse oscillating lasers. Further, when, by eliminating filter 28, the aforesaid separation is carried out employing a method utilizing the delay of the emission, as shown in Japanese Patent O.P.I. Publication No. 59-22046, it is more preferable to use a pulse oscillating laser rather than a continuously oscillating laser which has been modulated.

Of the aforesaid various laser beam sources, semiconductor lasers are most preferably employed since they are small-sized, less expensive, and require no modifiers.

EXAMPLE

The present invention will now be described with reference to examples. However, the embodiments of the present invention are not limited to these examples.

EXAMPLE (Preparation of Radiation Image Conversion Panel)

On the surface of an aluminum support (A110 XL type, a product of Sumitomo Light Metal Industries, Ltd.) of 500× 500 $\mu m^2$ and a thickness of 0.5 mm, or of a carbon fiber reinforced resin plate (CFRP#167A, a product of Toho Tenax Co., Ltd., being an impregnating resin-curing epoxy resin) at a size of 500×500 $mm^2$ and a thickness of 2 mm, a stimulable phosphor layer comprising a stimulable phosphor of CsBr:0.001Eu was formed via vacuum evaporation.

On the occasion of vacuum evaporation, the support was placed in the vacuum evaporation apparatus, and subsequently the raw stimulable phosphor material of CsBr: 0.001Eu and NaBr, shaped by pressing, were charged into a water-cooled crucible as the evaporation source. The air in the apparatus was exhausted via a pump connected to the exhausting opening, of which argon gas was introduced from the gas introducing opening to maintain the vacuum degree within the apparatus at $1.0 \times 10^{-2}$ Pa. Then, the evaporation source was heated to 850° C., maintaining a surface temperature of the support of 100° C., so that the alkali halide phosphor of CsBr:0.001Eu was evaporated from the direction normal to the support surface, setting the distance between the support and the evaporation source to 60 cm, and employing an aluminum slit while rotating the support, whereby the above alkali halide phosphor was formed on one side of the support. The deposition was finished when the thickness of the stimulable phosphor layer reached 400 μm. This phosphor layer was subsequently heat-treated at 150° C. to obtain a radiation image conversion plate.

Next, laminated protective film A, containing an alumina deposited PET resin layer, was prepared as shown below.

Laminated protective film A: VMPET12///VMPET12/// PET VMPET in laminated protective film A is the alumina deposited PET (a product of Toyo Metalizing Co., Ltd., available on the market), and PET represents polyethylene terephthalate. The above /// represents a 3.0 μm thickness for two-liquid type reactive urethane adhesive agent layer via dry laminating adhesion. The numeral indicated behind each of the resin films represents film thickness in μm.

The above prepared radiation image conversion plate was encased in the two protective films described above under reduced pressure, laminated protective film A was thermally adhered to the support at the portions extending to the outer side of peripheral area of the phosphor layer, and radiation image conversion panels 1–12 were prepared by removing laminated protective film A on the rear surface side. Incidentally, the same evaporation sources (6 kinds) were used for radiation image conversion panels 1–2, 3–4, 5–6, 7–8, 9–10, or 11–12. Each of these 6 kinds of evaporation sources has a different mixing ratio of the raw stimulable phosphor material of CsBr:0.001Eu and NaBr.

The concentration of NaBr in the resulting radiation image conversion panel was measured via induced coupled plasma optical emission spectrometry (also known as ICP-AES), and the X-ray resistance property was also measured as described below.

(X-RAY RESISTANCE PROPERTY)

First, luminance of radiation image conversion panel (A) was measured via the following luminance measuring method. Next, the entire surface of a radiation image conversion panel was exposed to 10R X-ray, and X-ray information recorded in the radiation image conversion panel was erased with halogen light. This process was repeated until the accumulated amount of X-ray reached 600R, and luminance of radiation image conversion panel (B) was measured at this point. X-ray resistance property (%) was calculated, employing the following formula. Incidentally, higher X-ray resistance property resulted in higher irradiation X-ray resistance.

X-ray resistance property (%)=B/A x 100

(LUMINANCE MEASURING METHOD)

In the luminance measurement, after the entire surface of a radiation image conversion panel is exposed to X-ray at a tube voltage of 80 kVp, the radiation image conversion panel was excited by scanning with a semiconductor laser (680 nm) of 100 mW, and the stimulated luminescence emitted from a phosphor layer was received with a photomultiplier tube (manufactured by Hamamatsu Photonics K.K.) to be converted to electrical signals, which were analogue/digital converted and recorded on a hard disk. The signal value of an X-ray plane image recorded on a hard disk was analyzed via a computer to determine the emission luminance intensity, and this value was defined as luminance.

The concentration of NaBr contained in a stimulable phosphor layer and the X-ray resistance property are shown in Table 1.

TABLE 1

| Radiation image conversion panel No. | Support | Concentration of NaBr (ppm) | X-ray resistance property (%) | Remarks |
|---|---|---|---|---|
| 1 | Aluminum | 3.8 | 44 | Comparative example |
| 2 | CFRP | 3.9 | 46 | Comparative example |
| 3 | Aluminum | 6.0 | 53 | Present example |
| 4 | CFRP | 6.2 | 55 | Present example |
| 5 | Aluminum | 8.8 | 62 | present example |
| 6 | CFRP | 8.8 | 63 | Present example |
| 7 | Aluminum | 14.0 | 68 | Present example |
| 8 | CFRP | 14.3 | 68 | present example |
| 9 | Aluminum | 21.0 | 50 | Present example |
| 10 | CFRP | 21.5 | 50 | Present example |
| 11 | Aluminum | 29.0 | 47 | Comparative example |
| 12 | CFRP | 29.6 | 45 | Comparative example |

It is to be understood via Table 1 that each of radiation image conversion panels in the present invention exhibits excellent X-ray resistance property, compared to comparative examples.

[Effect of the Invention]

A radiation image conversion panel exhibiting excellent X-ray irradiation resistance property and a manufacturing method thereof can be provided via the present invention.

What is claimed is:

1. A radiation image conversion panel comprising a stimulable phosphor layer containing a stimulable phosphor provided on a support,
   wherein the stimulable phosphor is expressed by following general formula (1), and the stimulable phosphor layer contains NaX''' of 5–25 PPM where X''' is at least one halogen atom selected from the group including F, Cl, Br, and I, $$M^1X \cdot aM^2X' \cdot bM^3X''_3 : eA \qquad \text{General Formula (1);}$$

where $M^1$ is at least one alkaline metal atom selected from the group including Li, Na, K, Rb, and Cs; $M^2$ is at least one alkaline metal atom selected from the group including Li, Na, K, Rb, and Cs except for $M^1$; $M^3$ is at least one trivalent metal atom selected from the group including Y, La, Ce, Pr, Nd, Pm, Sm, Eu, Gd, Tb, Dy, Ho, Er, Tm, Yb, and Lu; X, X', and X'' each represents at least one halogen atom selected from the group including F, Cl, Br, and I; A represents at least one metal atom selected from the group including Eu, Tb, In, Ce, Tm, Dy, Pr, Ho, Nd, Yb, Er, Gd, Lu, Sm, and Y; and "a", "b", and "e" are numbers satisfying the conditions of $0 \leq a < 0.5$, $0 \leq b < 0.5$, and $0 < e \leq 0.2$, respectively, provided that X is not X''' when $M^1$ or $M^2$ is Na.

2. The radiation image conversion panel of claim 1, wherein the stimulable phosphor expressed by aforesaid general formula (1) is a stimulable phosphor expressed by the following general formula;

$$CsBr:yEu \qquad \text{General Formula (2)}$$

where y is the numerical value in the range of $0 < y \leq 0.2$.

3. A method for manufacturing the radiation image conversion panel of claim 1,
   wherein the stimulable phosphor layer comprising columnar crystals provided on a support is formed via vapor deposition by heating the raw stimulable phosphor material charged into a crucible to 600–800° C. by a resistance heating method.

4. The radiation image conversion panel of claim 1,
   wherein the stimulable phosphor is a compound expressed by aforesaid general formula (1), and comprises NaX''' of 5–25 PPM where X''' is at least one halogen atom selected from the group including F, Cl, Br, and I.

5. The radiation image conversion panel of claim 1,
   wherein the stimulable phosphor layer comprising columnar crystals provided on a support is formed via vapor deposition by heating the raw stimulable phosphor material charged into a crucible to 600–800° C. by a resistance heating method.

6. The radiation image conversion panel of claim 1,
   wherein the stimulable phosphor consists of a compound expressed by aforesaid general formula (1), and contains NaX''' of 5–25 PPM where X''' is at least one halogen atom selected from the group including F, Cl, Br, and I.

* * * * *